(12) United States Patent  
Hughes et al.

(10) Patent No.: US 10,343,547 B2
(45) Date of Patent: Jul. 9, 2019

(54) VEHICLE CONTROL SYSTEM AND METHOD

(71) Applicant: JAGUAR LAND ROVER LIMITED, Warwickshire (GB)

(72) Inventors: Ian Hughes, Coventry (GB); Baptiste Bureau, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 251 days.

(21) Appl. No.: 15/312,245

(22) PCT Filed: May 20, 2015

(86) PCT No.: PCT/EP2015/061112
§ 371 (c)(1),
(2) Date: Nov. 18, 2016

(87) PCT Pub. No.: WO2015/177218
PCT Pub. Date: Nov. 26, 2015

(65) Prior Publication Data
US 2017/0101030 A1  Apr. 13, 2017

(30) Foreign Application Priority Data

May 20, 2014 (GB) .................................. 1408912.2

(51) Int. Cl.
*B60L 11/18* (2006.01)
*B60R 16/023* (2006.01)
*B60L 58/26* (2019.01)

(52) U.S. Cl.
CPC ........... *B60L 11/1874* (2013.01); *B60L 58/26* (2019.02); *B60R 16/0236* (2013.01);
(Continued)

(58) Field of Classification Search
CPC .............. B60L 11/1874; B60L 2260/56; B60L 2240/62; B60L 2240/622; B60R 16/0236;
(Continued)

(56) References Cited

U.S. PATENT DOCUMENTS 8,738,225 B2 * 5/2014 Przybylski .............. B60R 25/33
307/80
2010/0324765 A1  12/2010 Iida et al.
(Continued)

FOREIGN PATENT DOCUMENTS

DE  102011002780 A1 * 7/2012
JP  2006139963 A  6/2006
(Continued)

OTHER PUBLICATIONS

Combined Search and Examination Report for Application No. GB1408912.2 dated Nov. 27, 2014.
(Continued)

*Primary Examiner* — Jerrah Edwards

(57) ABSTRACT

A control system or controller (190) for a vehicle (100), the vehicle (100) comprising: at least one energy-consuming subsystem (180), such as a battery cooling system (180), for controlling a or a respective first vehicle operating parameter, e.g. the battery operating temperature, and actuation means for the subsystem (180) for activating or deactivating it in accordance with vehicle operational requirements; wherein the control system (190) is configured to: determine a value of a or a respective second vehicle operating parameter which is dependent on a location of the vehicle (100), such as a distance (x, y) between a current location of the vehicle and a reference location, e.g. a driver's home or workplace, and control the actuation means of the subsystem (180) so as to deactivate the subsystem (180), optionally for a prescribed period of time, in dependence on the value of the determined vehicle location-dependent second vehicle (Continued)

operating parameter. Since the reference location is optionally a location at which the vehicle is expected to be parked and so will not require active battery cooling, when the vehicle is within easy reach of that destination, e.g. according to current battery temperature or predicted drive time to that destination, the battery cooling system (180) can be temporarily deactivated, in order to save energy wastage and battery drain, and improve fuel economy and electric range. Embodiments are applicable to other energy-hungry vehicle systems, e.g. heating or cooling systems (182, 184) of other vehicle components.

21 Claims, 4 Drawing Sheets

(52) U.S. Cl.
CPC ..... *B60L 2240/62* (2013.01); *B60L 2240/622* (2013.01); *B60L 2260/56* (2013.01); *Y02T 10/705* (2013.01); *Y02T 10/7005* (2013.01); *Y02T 10/7291* (2013.01); *Y02T 90/16* (2013.01); *Y02T 90/162* (2013.01)

(58) Field of Classification Search
CPC ............... Y02T 10/7005; Y02T 10/705; Y02T 10/7291; Y02T 90/16; Y02T 90/162
See application file for complete search history.

(56) References Cited

U.S. PATENT DOCUMENTS

| | | |
|---|---|---|
| 2012/0053772 A1 | 3/2012 | Lu |
| 2012/0290161 A1 | 11/2012 | Takeda et al. |
| 2013/0046428 A1* | 2/2013 | Jordan ................. B60L 1/06 701/22 |
| 2013/0158762 A1 | 6/2013 | An et al. |
| 2013/0238180 A1 | 9/2013 | Bold et al. |
| 2014/0197803 A1* | 7/2014 | Ishikawa ........... B60L 11/1816 320/150 |

FOREIGN PATENT DOCUMENTS

| | | | |
|---|---|---|---|
| JP | 2010166676 A | * | 7/2010 |
| JP | 2010166676 A | | 7/2010 |
| WO | 2012091377 A2 | | 7/2012 |
| WO | 2012161262 A1 | | 11/2012 |

OTHER PUBLICATIONS

Combined Search and Examination Report for Application No. GB1508636.6 dated Nov. 18, 2015.
International Search Report and Written Opinion for International Application No. PCT/EP2015/061127 dated Aug. 14, 2015.

* cited by examiner

VEHICLE CONTROL SYSTEM AND METHOD

TECHNICAL FIELD

The present invention relates to vehicle control systems. More particularly, though not exclusively, it relates to a control system for controlling one or more subsystems of a vehicle, especially but not exclusively an electric or hybrid electric vehicle. The invention relates especially, though not essentially, to a control system for controlling a cooling system for a charge storage device, e.g. a battery, of such a vehicle.

BACKGROUND

Hybrid electric vehicles having an internal combustion engine and an electrical propulsion motor each operable to provide drive torque to drive the vehicle, alone or in combination, are well-known. The propulsion motor is powered by a propulsion battery. The vehicle may be operated in an electric vehicle (EV) mode in which the engine is switched off and the electrical propulsion motor provides drive torque to drive the vehicle as required. The vehicle may also be operated in a parallel mode in which the engine is switched on and the electrical propulsion motor is operable either to provide drive torque in addition to the engine, in a parallel boost mode, or to generate electrical charge to recharge the propulsion battery, in a parallel recharge mode. A vehicle control system determines when to switch the internal combustion engine on or off, and when to open or close a clutch between the engine and a transmission. In some vehicles the electric propulsion motor is integrated into the transmission.

Also known are various vehicles which are exclusively electrically driven, in which an electrical propulsion motor alone provides the drive torque to drive the vehicle, the motor being powered by a propulsion battery which is rechargeable as or when required, for example at a recharging station.

Many examples of batteries used in known electric or hybrid electric vehicles generally require their internal temperature to be maintained within a carefully controlled temperature range in order to provide optimum performance and, especially, to be able to undergo charging or recharging at optimum efficiency. For this purpose such batteries generally require some kind of dedicated cooling system, which may be actuated as or when required in order to maintain the battery temperature at a desired level during operation of the vehicle. Such battery cooling systems are generally powered from the battery itself, or some other on-board charge storage device.

However, such battery cooling systems tend to be relatively power-hungry and use a relatively large amount of energy to run. It is increasingly important to seek to limit unnecessary energy wastage in motor vehicles. Furthermore reductions in electrical energy used by vehicle systems can enable a reduction in battery size, increased battery lifespan, and, in case of electric vehicles or hybrid electric vehicles, increased range of the vehicle.

SUMMARY

Embodiments of the invention may be understood with reference to the appended claims.

Aspects of the present invention provide a control system for a vehicle, a controller for a vehicle subsystem, a vehicle, a method of controlling a vehicle, a method of controlling a subsystem of a vehicle, a computer readable medium, a carrier medium, a computer program product or a processor.

In an aspect of the invention for which protection is sought there is provided a control system for a vehicle, the vehicle comprising:
 at least one energy-consuming subsystem for controlling a or a respective first vehicle operating parameter, and
 actuation means for the or each subsystem for activating or deactivating the or each respective subsystem in accordance with vehicle operational requirements;
 wherein the control system is configured to:
 determine a value of a or a respective second vehicle operating parameter which is dependent on a location of the vehicle, and
 control the actuation means of the or each respective subsystem so as to enter an energy saving mode in which operation of the or each respective subsystem is inhibited in dependence on the value of the determined vehicle location-dependent second vehicle operating parameter.

The at least one subsystem may comprise a cooling system. The cooling system may be for a charge storage device. By virtue of cooling the charge storage device for less time, one advantage of configuring the control system to enter this 'energy saving mode' is that energy that would otherwise be used to cool the charge storage device unnecessarily can be saved.

The or each respective first vehicle operating parameter may be an operating temperature of the charge storage device.

If the or each respective subsystem is activated when the energy saving mode is entered, the or each respective subsystem may be deactivated. If the or each respective subsystem is not activated when the energy saving mode is entered, the or each respective subsystem may be maintained in its non-activated state.

The control system may be configured to control the actuation means of the or each respective subsystem so as to enter the energy saving mode for a period of time in dependence on the value of the second vehicle operating parameter.

The vehicle may comprise an electrical propulsion motor and the charge storage device may be for powering the motor. The electric vehicle may be a hybrid electric vehicle. The vehicle may comprise an engine, such as an internal combustion engine. The at least one charge storage device may be for powering the at least one vehicle subsystem.

The said operating temperature may be selected from at least one of an internal operating temperature of the charge storage device and/or an internal charging temperature of the charge storage device.

The second vehicle operating parameter may be a distance between a location of the vehicle at a present or given point in time and a reference location at which the vehicle is expected to be in a state in which activation of the or each respective subsystem is not required or its non-activation can be tolerated for at least the said period of time.

The said reference location may be a reference location at which the vehicle is expected to be in said state, in which activation of the or each respective subsystem is not required or its non-activation can be tolerated for at least the said period of time, by prediction, and/or by reference to historical data and/or by reference to manually input data.

The reference location may be defined by one or more of:
 (i) manually input data for a journey of the vehicle; and/or (ii) historical data from a plurality of previous journeys of the vehicle, from which one or more commonly or frequently encountered destinations characteristic of the relevant subsystem not being required for at least the period of time is/are predefined.

The reference location may be a vehicle user's home or workplace, or other commonly frequented location at which the vehicle is habitually left stationary with the engine or motor switched off for a prolonged period of time.

The energy saving mode may be entered for as long as inhibition of the or each respective subsystem can be tolerated or permitted. The period of time for which the or each respective subsystem is inhibited by its respective actuation means, in dependence on the location-dependent second vehicle operating parameter, may be no more than a period of time during which non-operation or deactivation of the relevant subsystem can be tolerated or permitted.

The said period of time for which the or each respective subsystem is inhibited by its respective actuation means, in dependence on the location-dependent second vehicle operating parameter, may be dependent on a value of the or each said respective first vehicle operating parameter which is controlled by the said subsystem. The period of time for which its inhibition may be controlled or permitted may be selected in dependence on a current demand for cooling of the charge storage device or a predicted demand for cooling of the charge storage device as dictated by the second vehicle operating parameter.

The said period of time for which the or each respective subsystem is inhibited by its respective actuation means, in dependence on the location-dependent second vehicle operating parameter, may be dependent on the identity of and/or the state of and/or current or predicted demands of the said subsystem.

The value of the vehicle location-dependent second vehicle operating parameter may be a distance between a current location of the vehicle and a reference location thereof, and may correspond to a determined, calculated or measured value of said distance. The said distance between the current location of the vehicle and the reference location thereof may be determined, calculated or measured in terms of a physical distance from the current location to the reference location. The energy saving mode may be entered dependent, at least in part, on the physical distance.

The said distance between the current location of the vehicle and the reference location thereof may be determined, calculated or measured in terms of a particular time period needed to cover that distance. One or more other driving or vehicle operational parameters may additionally be taken into account in the said distance determination, calculation or measurement. The energy saving mode may be entered dependent, at least in part, on the particular time period. One or more other driving or vehicle operational parameters may additionally be taken into account in the said distance determination, calculation or measurement.

The at least one energy-consuming vehicle subsystem may comprise one or more heating or cooling systems of one or more other vehicle components, different from a charge storage device. The or each respective first vehicle operating parameter may be a temperature of the said respective one or more other vehicle components.

In an aspect of the invention for which protection is sought there is provided a vehicle comprising a controller according to the preceding aspect.

In an aspect of the invention there is provided a vehicle comprising a body, a plurality of wheels, a powertrain to drive said wheels, a braking system to brake said wheels, and a controller or a control system according to any other aspect of the invention.

In an aspect of the invention for which protection is sought there is provided a control system for a vehicle, the vehicle comprising:
  at least one energy-consuming subsystem for controlling a or a respective first vehicle operating parameter, and
  actuation means for the or each subsystem for activating or deactivating the or each respective subsystem in accordance with vehicle operational requirements;
  wherein the control system is configured to:
  determine a value of a or a respective second vehicle operating parameter which is dependent on a location of the vehicle, and
  control the actuation means of the or the each respective subsystem so as to deactivate the or each respective subsystem in dependence on the value of the determined vehicle location-dependent second vehicle operating parameter.

In an aspect of the invention for which protection is sought there is provided a vehicle comprising a control system according to the preceding aspect.

In an aspect of the invention for which protection is sought there is provided a controller for controlling at least one energy-consuming subsystem of a vehicle, the or each respective subsystem being for controlling a or a respective first operating parameter of the vehicle,
  the vehicle further comprising actuation means for the or each subsystem for activating or deactivating the or each respective subsystem in accordance with vehicle operational requirements,
  wherein the controller is configured to:
  determine a value of a or a respective second vehicle operating parameter which is dependent on a location of the vehicle, and
  control the actuation means of the or each respective subsystem so as to enter an energy saving mode in which operation of the or each respective subsystem is inhibited in dependence on the value of the determined vehicle location-dependent second vehicle operating parameter.

In an aspect of the invention for which protection is sought there is provided a vehicle comprising a controller according to the preceding aspect.

In an aspect of the invention there is provided a vehicle comprising a body, a plurality of wheels, a powertrain to drive said wheels, a braking system to brake said wheels, and a controller or a control system according to any other aspect of the invention.

In an aspect of the invention for which protection is sought there is provided a method of controlling a vehicle, the vehicle comprising:
  at least one energy-consuming subsystem for controlling a or a respective first vehicle operating parameter, and
  actuation means for the or each subsystem for selectively activating or deactivating the or each respective subsystem in accordance with vehicle operational requirements;
  wherein the method comprises:
  determining a value of a or a respective second vehicle operating parameter which is dependent on a location of the vehicle, and
  controlling the actuation means of the or each respective subsystem so as to enter an energy saving mode in which operation of the or each respective subsystem is inhibited in dependence on the value of the determined vehicle location-dependent second vehicle operating parameter.

In an aspect of the invention for which protection is sought there is provided a method of controlling a vehicle, the vehicle comprising:
at least one energy-consuming subsystem for controlling a or a respective first vehicle operating parameter, and actuation means for the or each subsystem for activating or deactivating the or each respective subsystem in accordance with vehicle operational requirements;
wherein the method comprises:
determining a value of a or a respective second vehicle operating parameter which is dependent on a location of the vehicle, and
controlling the actuation means of the or each respective subsystem so as to deactivate the or each respective subsystem in dependence on the value of the determined vehicle location-dependent second vehicle operating parameter.

In an aspect of the invention for which protection is sought there is provided a method of controlling at least one energy-consuming subsystem of a vehicle, the at least one energy-consuming subsystem being for controlling a or a respective first vehicle operating parameter,
the vehicle further comprising actuation means for the or each subsystem for activating or deactivating the or each respective subsystem in accordance with vehicle operational requirements,
wherein the method comprises:
determining a value of a or a respective second vehicle operating parameter which is dependent on a location of the vehicle, and
controlling the actuation means of the or each respective subsystem so as to deactivate the or each respective subsystem in dependence on the value of the determined vehicle location-dependent second vehicle operating parameter.

In an aspect of the invention for which protection is sought there is provided a method of controlling at least one energy-consuming subsystem of a vehicle, the at least one energy-consuming subsystem being for controlling a or a respective first vehicle operating parameter,
the vehicle further comprising actuation means for the or each subsystem for activating or deactivating the or each respective subsystem in accordance with vehicle operational requirements,
wherein the method comprises:
determining a value of a or a respective second vehicle operating parameter which is dependent on a location of the vehicle, and
controlling the actuation means of the or each respective subsystem so as to so as to enter an energy saving mode in which operation of the or each respective subsystem is inhibited in dependence on the value of the determined vehicle location-dependent second vehicle operating parameter.

In some embodiments of the invention the control system may be configured to control the actuation means of the or each respective subsystem so as to deactivate the or each respective subsystem for a prescribed period of time in dependence on the value of the second vehicle operating parameter.

In some embodiments of the invention the vehicle is an electric vehicle, including an electrical propulsion motor and a charge storage device for powering the motor, wherein the at least one vehicle subsystem is powered by the charge storage device.

In some embodiments the electric vehicle is a hybrid electric vehicle.

In some embodiments of the invention the vehicle may comprise an engine, such as an internal combustion engine, and at least one charge storage device for powering the at least one vehicle subsystem.

In some embodiments of the invention the at least one energy-consuming vehicle subsystem comprises a cooling system for the charge storage device, e.g. battery, and the or each respective first vehicle operating parameter is an operating temperature of the charge storage device. The said operating temperature may be an internal operating temperature of the charge storage device. Alternatively or additionally the said operating temperature may be an internal charging temperature of the charge storage device.

In other embodiments of the invention the at least one energy-consuming vehicle subsystem may comprise one or more heating or cooling systems of one or more other vehicle components and the or each respective first vehicle operating parameter is a temperature of the said respective one or more other vehicle components. Examples of such alternative energy-consuming subsystems may include a heating system for one or more seats within the vehicle, an air conditioning system, a cabin heating system or an external heating system for vehicle lights or windows.

In some embodiments of the invention the at least one energy-consuming subsystem may act to control the or each respective first vehicle operating parameter in any suitable manner. For example, it may act to switch it merely on or off, or it may act so as to select or vary the value of the relevant first vehicle operating parameter in any desired manner.

In some embodiments of the invention the actuation means for activating or deactivating the or each respective subsystem in accordance with vehicle operational requirements may be any suitable actuation means as are already used in known vehicle control systems for actuating subsystems such as those mentioned above. For example, any suitable temperature-sensing means and subsystem-command means may be used to activate and/or deactivate the relevant subsystem as and when its operation is required.

For instance in the case of a battery cooling system, a conventional thermostat and command device, optionally in combination with reference data and/or predictive data of optimum battery temperatures, may be employed for determining whether battery cooling is required or desirable at any time of operation of the vehicle, and for activating or deactivating the battery cooling system accordingly.

In other examples conventional automatic or manually operated actuation means may be used to effect appropriate activation or deactivation of the relevant heating, cooling or other energy-consuming subsystem according to current or predicted demand therefor.

According to an aspect of the present invention, a value of a or a respective second vehicle operating parameter is determined, which is dependent on a location of the vehicle, and that determined value of that vehicle location-dependent second vehicle operating parameter is used as the basis for governing the deactivation of the or each respective subsystem by its respective actuation means. Optionally, the determined value of that second vehicle operating parameter is used as the basis for prescribing a minimum period of time for which the or each respective subsystem is deactivated by its respective actuation means.

The second vehicle operating parameter is optionally a distance between a location of the vehicle at a present or given point in time (i.e. a current location) and a reference location at which the vehicle may be expected—such as from prediction and/or by reference to historical data—to be in a state in which activation of the or each respective energy-consuming subsystem is not required, or its non-activation can be tolerated for at least the said prescribed period of time.

Thus, the value of that second vehicle operating parameter is optionally a measure of the distance between a current location of the vehicle and a reference location at which the vehicle may be expected to be in a state that does not require or can tolerate an absence of activation of the or each respective subsystem, at least for the said prescribed period of time.

A current location of a vehicle may be determined by any suitable known means, for example GPS (global positioning system) or satellite navigation data, or a cellular network location determining system.

A reference location at which a vehicle may be expected to be in a state, at least for the said prescribed period of time, in which activation of the or each respective energy-consuming subsystem is not required, may be any suitable or desired location, defined for example by reference to historical or predictive data, or even manually input data.

In some embodiments the reference location may be defined for a given journey of the vehicle by location data for example manually or otherwise input into a GPS or satellite navigation system for the said journey.

In other embodiments the reference location may be defined by historical data from a plurality of previous journeys, from which one or more commonly or frequently encountered destinations characteristic of the relevant subsystem not being required, and thus being deactivatable, for at least the prescribed period of time can be predefined. Such "learned" reference locations may be for example a driver's (or other vehicle user's) home or workplace, or other commonly frequented parking location.

In some embodiments the reference location at which the vehicle may be expected to be in a state, at least for the said prescribed period of time, in which deactivation of the or each respective energy-consuming subsystem is controlled by the control system, may be dependent on the identity of the vehicle subsystem in question.

For example, in the case of a battery cooling system as the relevant vehicle subsystem, the reference location may be the above-mentioned driver's home or workplace, or other commonly frequented location at which the vehicle is habitually left stationary with the engine or motor switched off for a prolonged period of time, e.g. overnight, since at such locations it may be expected that natural cooling of the battery can occur over that extended period at that location without the need for a dedicated battery cooling system to be activated and thus energy expended in running it.

As another example, in the case of a vehicle seat heater, or a headlight de-icer or an air conditioning system as the said subsystem, the reference location may again be the above-mentioned driver's home, workplace or other commonly frequented location where it is typical for a journey to end and thus at which such a heating or cooling subsystem will no longer be required anyway and may even be dispensed with before that destination is reached, especially if the distance thereto is relatively short.

In some embodiments of the invention the prescribed period of time for which the or each respective subsystem is deactivated by its respective actuation means, in dependence on the vehicle location-dependent second vehicle operating parameter, is optionally no more than a predetermined period of time—which may in practice be zero minutes or seconds, if circumstances should dictate that—during which non-operation or deactivation of the relevant subsystem can be tolerated or permitted, optionally substantially without any negative consequences or deleterious results from the said non-operation of the subsystem in question for that period of time.

In some embodiments the said prescribed period of time may be dependent on a value of the said first vehicle operating parameter which is controlled by the said subsystem.

For example, in the case of a battery cooling system as the vehicle subsystem, the prescribed period of time for which its deactivation may be controlled or permitted may be selected in dependence on the battery temperature itself, especially the current battery temperature, so that deactivation of the battery cooling system only occurs when, or only for so long as, there is zero present need for active battery cooling.

By way of another example in the case of a battery cooling system as the vehicle subsystem, the prescribed period of time for which its deactivation may be controlled or permitted may be selected in dependence on a temperature of the battery that is expected or predicted to be reached in dependence on the determined value of the vehicle location-dependent second vehicle operating parameter. Thus, in this case deactivation of the battery cooling subsystem may be controlled or permitted for a period of time determined to be that period of time during which the temperature of the battery is expected or predicted to remain below a target temperature thereof, or not to exceed a target temperature thereof, as dictated by the vehicle location-dependent second vehicle operating parameter.

As another example, in the case of a vehicle seat heater, or a headlight de-icer or an air conditioning system as the said subsystem, the prescribed period of time for which its deactivation may be controlled or permitted may be selected so as to be no more than an acceptable period of time to be without operation of such a heating or cooling system, for example as dictated by driver or passenger comfort, weather conditions or other vehicle operational parameters.

In some embodiments the said prescribed period of time may be dependent on the identity of and/or the state of and/or current or predicted future demands of the subsystem in question.

For example, in the case of a battery cooling system as the vehicle subsystem, the prescribed period of time for which its deactivation may be controlled or permitted may be selected in dependence on a current or predicted demand for battery cooling, for example in dependence on a current rate of or predicted increase in battery temperature, for example arising from particular vehicle operational parameters such as current driving conditions, ambient temperature, driving terrain, driving mode (e.g. dependent on drive mode of a four-wheel drive, AWD or all-terrain vehicle), and power demand on the battery from other vehicle operational systems and subsystems. In this manner a period of time for which the battery cooling system is deactivated is optionally limited to being a maximum of a time period—which, as mentioned above, may in practice be zero minutes or seconds, if circumstances should dictate that—for which deactivation of the battery cooling system is, or is predicted as being, able to be tolerated.

As another example, in the case of a vehicle seat heater, or a headlight de-icer or an air conditioning system as the said subsystem, the prescribed period of time for which its deactivation may be controlled or permitted may be selected according to current or expected future demands of that subsystem, for example depending on weather and/or driving conditions, or a current rate of change of temperature of or within the relevant heating or cooling system.

In some embodiments of the invention the prescribed period of time for which the or each respective subsystem is deactivated by its respective actuation means, in dependence on the vehicle location-dependent second vehicle operating parameter, may comprise a substantially single period of time over which the or each respective subsystem may be deactivated substantially continuously, or it may comprise a plurality of sub-periods of time over only some and not all of which the or each respective subsystem may be deactivated, i.e. it may comprise a period time over which the or each respective subsystem may be deactivated intermittently or non-continuously.

The value of the above-defined second vehicle operating parameter, optionally being a distance between the current location of the vehicle and the reference location thereof, optionally corresponds to a measure of that distance, and is optionally determined, calculated or measured in terms of any one of a plurality of different parameters.

For example, the distance between the current location of the vehicle and the reference location thereof may be determined, calculated or measured in terms of a physical distance from the current location to the reference location.

Alternatively the said distance may be determined, calculated or measured in terms of a particular time period needed to cover that distance, e.g. at a current driving speed or a known average traffic speed.

In the case of either example just mentioned, one or more other driving or vehicle operational parameters may additionally be taken into account in the said distance determination, calculation or measurement, for example known geographical features, speed limits, or known or detected road conditions which may place particular or special power or energy demands on the vehicle subsystem in question or the battery or other charge storage device itself.

In some practical embodiments of the present invention at least some of the components or elements of the control system, or the controller, or the methods of controlling a vehicle or the relevant subsystem(s), in particular at least the determination means which determines the value of the respective location-dependent second vehicle operating parameter and/or the control means which controls the actuation means of the or each respective subsystem, may be constituted by elements of suitable software and/or electronics hardware. Such software and/or hardware may for example be provided by a dedicated control system or controller for the subsystem(s) itself/themselves, or alternatively it may be provided as part of an overall operational control system of the vehicle.

Thus, in an aspect of the invention for which protection is sought there is provided a computer readable medium carrying computer program code for controlling a vehicle to carry out a method as defined in any of the preceding method aspects of the invention or embodiments thereof.

In an aspect of the invention for which protection is sought there is provided a control system for an electric vehicle, the vehicle comprising:
at least one energy storage device,
at least one energy-consuming subsystem powered by the energy storage device for controlling a or a respective first vehicle operating parameter, and
actuation means for the or each subsystem for activating or deactivating the or each respective subsystem in accordance with vehicle operational requirements;
wherein the control system comprises:
determination means for determining a value of a or a respective second vehicle operating parameter which is dependent on a location of the vehicle, and
control means for controlling the actuation means of the or each respective subsystem so as to deactivate the or each respective subsystem, optionally for a prescribed period of time, in dependence on the value of the determined vehicle location-dependent second vehicle operating parameter.

In an aspect of the invention for which protection is sought there is provided a controller for controlling at least one energy-consuming subsystem of a vehicle, the or each respective subsystem being for controlling a or a respective first operating parameter of the vehicle, the vehicle comprising:
at least one energy storage device,
said at least one subsystem, and
actuation means for the or each subsystem for activating or deactivating the or each respective subsystem in accordance with vehicle operational requirements;
wherein the controller comprises:
determination means for determining a value of a or a respective second vehicle operating parameter which is dependent on a location of the vehicle, and
control means for controlling the actuation means of the or each respective subsystem so as to deactivate the or each respective subsystem, optionally for a prescribed period of time, in dependence on the value of the determined vehicle location-dependent second vehicle operating parameter.

In an aspect of the invention for which protection is sought there is provided a computer readable medium carrying computer program code for controlling a vehicle to carry out a method as defined in any of the preceding method aspects of the invention or embodiments thereof.

In an aspect of the invention for which protection is sought there is provided a carrier medium carrying computer readable code for controlling a vehicle to carry out a method as defined in any of the preceding method aspects of the invention or embodiments thereof.

In an aspect of the invention for which protection is sought there is provided a computer program product executable on a processor so as to carry out a method as defined in any of the preceding method aspects of the invention or embodiments thereof.

In an aspect of the invention for which protection is sought there is provided a computer readable medium loaded with the computer program product of a preceding aspect.

In an aspect of the invention for which protection is sought there is provided a processor arranged to implement a method as defined in any of the preceding method aspects of the invention or embodiments thereof, or the computer program product of a preceding aspect.

Some embodiments of the invention provide a control system that is configured to delay cooling of a battery of a hybrid electric vehicle when it is determined that cooling of the battery is required, but that cooling can be delayed without damaging the battery because the control system detects that the vehicle has almost reached its destination. Because continued heating of the battery, for example due to a load on the battery, is likely to be terminated once the vehicle reaches the destination, the control system does not trigger cooling of the battery unless a predetermined time period expires before reaching the destination. One advantage of such embodiments is that energy that would otherwise be used to cool the battery unnecessarily can be saved.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless expressly stated otherwise or such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Some embodiments of the present invention in its various aspects will now be described in detail, by way of example only, with reference to the accompanying drawings, in which.

DETAILED DESCRIPTION

Figure 1:
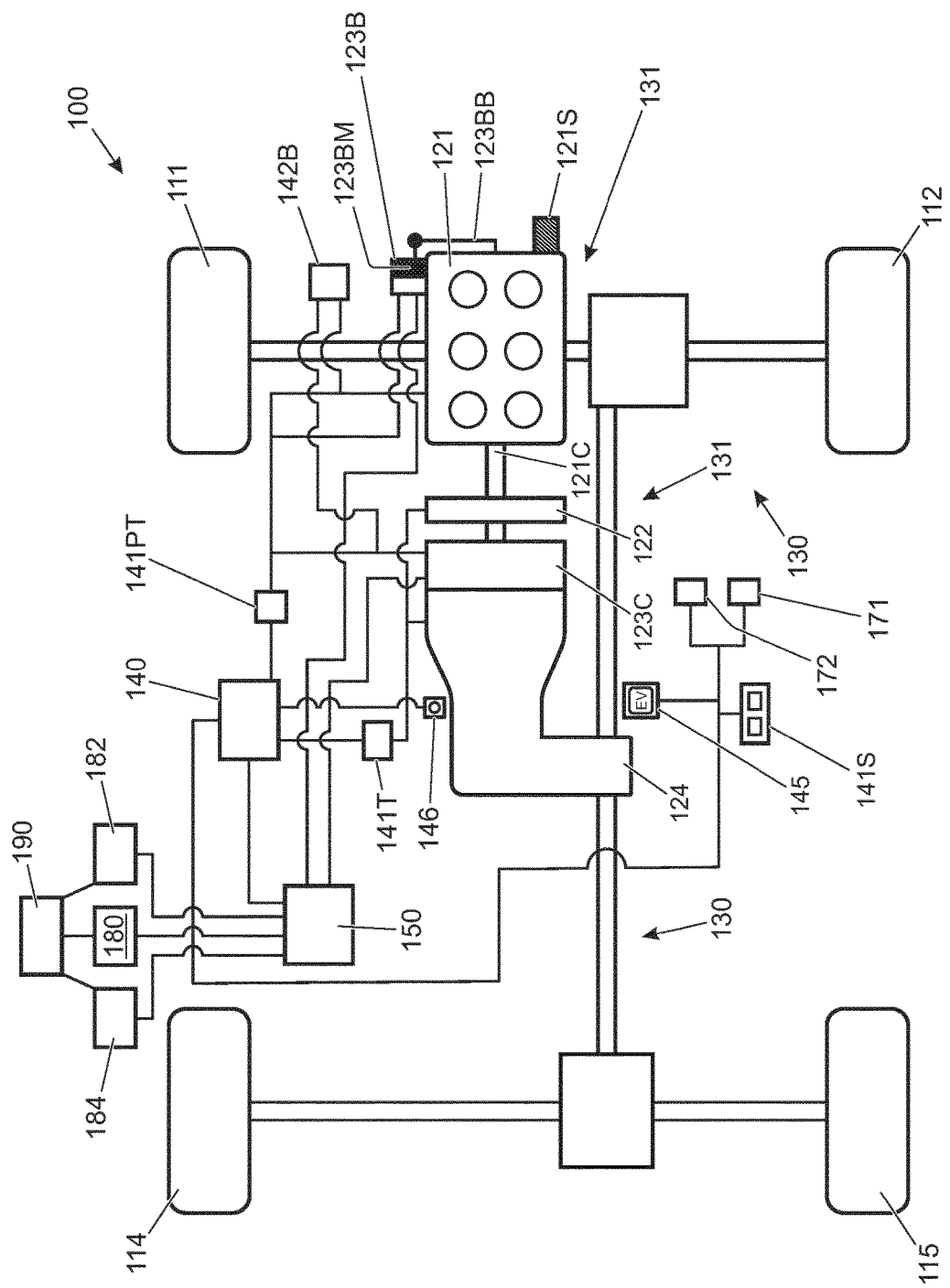
FIG. 1 is a schematic illustration of a hybrid electric vehicle including a controller for a battery cooling subsystem according to an embodiment of the invention.

In one embodiment of the invention a hybrid electric vehicle 100 is provided as shown schematically in FIG. 1. The vehicle 100 has an engine 121 coupled to a belt integrated starter generator (BISG) 123B. The BISG 123B may also be referred to as a belt integrated (or belt mounted) motor generator and is operable to crank the engine 121 when starting is required. In addition or instead, a dedicated starter motor 121S may be provided. In some embodiments therefore, a BISG may be provided but a separate starter motor is employed for starting the engine 121. In some embodiments the BISG may be omitted.

The engine 121 is coupled in turn to a crankshaft-integrated starter/generator (CIMG) 123C by means of a crankshaft 121C and clutch 122. The clutch 122 may also be referred to as a K0 clutch 122. The CIMG 123C is also operable to crank the engine 121 when required.

The CIMG 123C is integrated into a housing of a transmission 124 which is in turn coupled to a driveline 130 of the vehicle 100 thereby to drive a pair of front wheels 111, 112 and a pair of rear wheels 114, 115 of the vehicle 100. The driveline 130 in combination with the transmission 124, CIMG 123C, clutch 122, engine 121 and BISG 123B may be considered to form part of a powertrain 131 of the vehicle 100. Wheels 111, 112, 114, 115 arranged to be driven by the driveline 130 may also be considered to form part of the powertrain 131. The transmission is controlled by means of a transmission controller 141T.

It is to be understood that other arrangements may also be useful. For example the driveline 130 may be arranged to drive the pair of front wheels 111, 112 only or the pair of rear wheels 114, 115 only, or to be switchable between a two wheel drive mode in which the front or rear wheels only are driven and a four wheel drive mode in which the front and rear wheels are driven.

The BISG 123B and CIMG 123C are arranged to be electrically coupled to a charge storage module 150 having a battery and an inverter. The module 150 is operable to supply the BISG 123B and/or CIMG 123C with electrical power when one or both are operated as propulsion motors. Similarly, the module 150 may receive and store electrical power generated by the BISG 123B and/or CIMG 123C when one or both are operated as electrical generators. In some embodiments, the CIMG 123C and BISG 123B may be configured to generate different electrical potentials to one another.

Accordingly, in some embodiments each is connected to a respective inverter adapted to operate at the corresponding potential of the CIMG 123C or BISG 123B. Each inverter may have a respective battery associated therewith. In some alternative embodiments the CIMG 123C and BISG 123B may be coupled to a single inverter which is adapted to receive charge from the CIMG 123C and BISG 123B at the respective potentials and to store the charge in a single battery. Other arrangements may also be useful.

As noted above, the BISG 123B has an electric machine 123BM that is drivably coupled to the crankshaft 121C of the engine 121 by means of a belt 123BB. The BISG 123B is operable to provide torque to the crankshaft 121C when it is required to start the engine 121 or when it is required to provide torque-assist to the driveline 130.

The vehicle 100 has a vehicle controller 140 operable to command a powertrain controller 141PT to control the engine 121 to switch on or off and to generate a required amount of torque. The vehicle controller 140 is also operable to command the powertrain controller 141PT to control the BISG 123B to apply a required value of positive or negative torque (operating as a propulsion motor or a generator) to the engine 121. Similarly, the vehicle controller 140 may command the CIMG 123C to apply a required value of positive or negative torque (again operating as a propulsion motor or a generator) to the driveline 130 via the transmission 124.

The vehicle has an accelerator pedal 171 and a brake pedal 172. The accelerator pedal 171 provides an output signal to the vehicle controller 140 indicative of an amount by which the pedal 171 is depressed. The vehicle controller 140 is arranged to determine the amount of driver demanded torque based on the accelerator pedal position and one or more other vehicle parameters including engine speed W. In some embodiments, the powertrain controller 141PT is arranged to receive the accelerator pedal position signal and calculate the amount of driver demanded torque.

The vehicle 100 of FIG. 1 is operable by the vehicle controller 140 in an electric vehicle (EV) mode in which the clutch 122 is open and the crankshaft 121C is stationary. In EV mode the CIMG 123C is operable to apply positive or negative torque to the driveline 130 via the transmission 124. Negative torque may be applied for example when regenerative braking is required under the control of a brake controller 142B.

The powertrain 131 is operable in one of a plurality of parallel modes in which the engine 121 is switched on and the clutch 122 is closed. The parallel modes include a "parallel boost" mode in which the CIMG 123C is operated as a motor to provide drive torque to the driveline 130 in addition to the torque provided by the engine 121. In the present embodiment the powertrain 131 is operated in the parallel boost configuration when the amount of driver demanded torque exceeds the maximum torque available from the engine 121. The amount of additional torque available from the CIMG 123C may be determined in dependence on the vehicle configuration as described in more detail below. It is to be understood that the feature of torque boost increases the available drive torque beyond that which is available from the engine 121 alone.

The parallel modes also include a parallel torque filling mode and a parallel torque assist mode. The parallel torque filling mode is a mode in which the CIMG 123C delivers drive torque to the driveline 130 in addition to the engine 121 in order to meet driver demand for torque more quickly than if the engine 121 alone delivers drive torque. Torque filling provides the benefit that driver torque demand may be satisfied more quickly, improving a responsiveness of the vehicle to an increase in torque demand.

In the present embodiment torque filling is implemented when a rate of increase of driver torque demand relative to the amount of torque delivered by the engine 121 exceeds a prescribed value. Once driver torque demand has been satisfied, the amount of torque delivered by the CIMG 123C decreases as the amount of torque delivered by the engine 121 increases to meet driver demand substantially entirely, without a requirement for additional torque from the CIMG 123C.

In the torque-assist parallel mode the CIMG 123C provides steady-state drive torque in addition to the engine 121 in order to relieve loading on the engine 121. This may assist in reducing fuel consumption. Torque-assist may be considered to be distinct from "torque filling," the latter being employed in a transient manner when an increase in drive torque is required.

The powertrain 131 may alternatively be operated in a parallel recharge mode in which the CIMG 123C is driven as a generator by the engine 121 to recharge the charge storage module 150.

The vehicle 100 has a hybrid mode selector control 145 in the form of a rotatable dial. The selector control 145 is operable to select one of three hybrid modes: an EV mode, a hybrid mode and a hybrid inhibit mode.

In the EV mode, the controller 140 causes the engine 121 to remain switched off whilst propulsion torque is delivered, as required, by means of the CIMG 123C only. Once the state of charge of the charge storage module 150 falls below a predetermined amount, for example below 10% of a maximum usable charge capacity, the controller 140 causes the engine 121 to be switched back on and the powertrain 131 to assume the parallel recharge mode until the state of charge exceeds a predetermined value, for example 25% of a maximum usable charge capacity.

In the hybrid mode, the controller 140 causes the powertrain 131 to assume a parallel mode or the EV mode in dependence on an energy management methodology implemented by the controller 140. Further details of energy management methodology may be found in GB2483371A. The controller 140 seeks to balance the use of charge stored in the charge storage device 150 to operate the CIMG 123C as a propulsion motor and the burning of fuel by the engine 121 in order to reduce emission of greenhouse gases such as carbon dioxide. Other energy management methodologies may also be useful.

In the hybrid inhibit mode, the controller 140 latches the engine 121 in the on condition and the K0 clutch 122 in the closed condition and causes the engine 121 to drive the transmission 124 substantially continually whilst the transmission 124 is in a driving mode in which drive torque may be delivered by the transmission 124 to the road wheels 111, 112, 114, 115.

The brake controller 142B is operable to cause a friction-based foundation braking system to cause braking of each of the road wheels 111, 112, 114, 115. The brake controller 142B is also operable to command the powertrain controller 141PT to cause the CIMG 123C to act as a generator and apply negative torque to the driveline 130 in order to cause braking. This may be referred to as regenerative braking since charge generated by the CIMG 123C in effecting braking may be stored in the charge storage module 150.

The vehicle 100 is also operable by the controller 140 in a selected one of a plurality of driving modes or control modes. In the present embodiment the driving modes are user-selected by means of a driving mode selector dial 146. In each driving mode each one of a plurality of vehicle subsystems are operated in a subsystem configuration mode appropriate to a given driving condition. The driving modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RC mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode) which is a suitable compromise mode, or general mode, for all terrain conditions and especially vehicle travel on motorways and regular roadways. The SPO mode may also be referred to as a highway mode. Many other control modes may also be envisaged including those disclosed in US2003/0200016A.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains. The driving modes may be referred to as "Terrain Response" or "TR"® modes.

The controller 140 commands vehicle subsystem controllers to assume a predetermined subsystem control mode in dependence on the selected driving mode. In the present embodiment the controller 140 commands the transmission controller 141T, powertrain controller 141PT and brake controller 142B to assume a predetermined subsystem control mode. In some embodiments other vehicle subsystems may have subsystem configuration modes commanded by the controller 140 such as a power steering control system (not shown), suspension control system such as an air suspension control system (not shown) and/or any other suitable subsystem.

The brake controller 142B may be arranged to provide relatively high brake force for a given amount of pressure applied to the brake pedal 172 or a relatively low brake force, depending on the driving mode. The brake controller 142B may also be arranged to allow different levels of wheel slip when an anti-lock braking system is active, for example relatively low amounts on low friction ("low-mu") surfaces and relatively large amounts on high friction ("high-mu") surfaces.

The powertrain controller 141PT may be operated in "quick" or "slow" accelerator (or throttle) pedal progression configuration modes in which an increase in engine torque as a function of accelerator pedal progression is relatively quick or slow, respectively. The rate may be dependent on speed in one or more modes such as Sand mode.

The transmission controller 141T may be operated in a "normal" mode that provides a reasonable compromise between fuel economy and driving performance, a "performance" mode which generally keeps the transmission in lower gears than in the normal mode, particularly when the driver is requesting a high level of driving torque to accelerate the vehicle, and a "manual" mode in which the control of gear changes is given completely to the driver. The transmission 124 also has a "snow" or "ice" mode which generally keeps the transmission 124 in higher gears than the normal mode, in particular under acceleration from rest, to avoid loss of traction due to wheel spin, and a "sand" mode which keeps the transmission in relatively high gears at low speed to avoid excessive wheel spin. Excessive wheel spin can result in the wheels digging themselves into the sand at low speeds. However, the sand mode uses relatively low gears at higher speeds where a relatively high degree of wheel slip can be desirable to provide maximum traction. Lower gearing also helps the engine 121 to remain in an operating region where the engine speed is high and the power output is high, thereby helping to avoid the vehicle 100 becoming "bogged down" by a lack of power.

The vehicle 100 further includes an embodiment of a control system according to the present invention, which comprises a cooling subsystem 180 for the charge storage module 150 itself, or at least the battery (e.g. a HV battery) component thereof, and a controller 190 for controlling operation of the battery cooling subsystem 180. The cooling subsystem 180 is itself powered from the charge storage module 150. With many modern types of battery used in the charge storage module 150, it is often required that a battery operating temperature is carefully controlled so as to be at an optimum working temperature under typical vehicle operational conditions, which may vary over time or with various vehicle operational parameters, such as weather, driving conditions, SOC of the battery, and especially power demands made of the charge storage module 150 by various other control or operational systems of the vehicle.

As illustrated by way of example in FIG. 1, one or more additional (or indeed any total number of) energy-consuming (and optionally energy-hungry) vehicle subsystems 182, 184, etc may also be powered from the charge storage module 150 and be under the control of the controller 190 of the control system, as in this embodiment of the invention.

Figure 2:
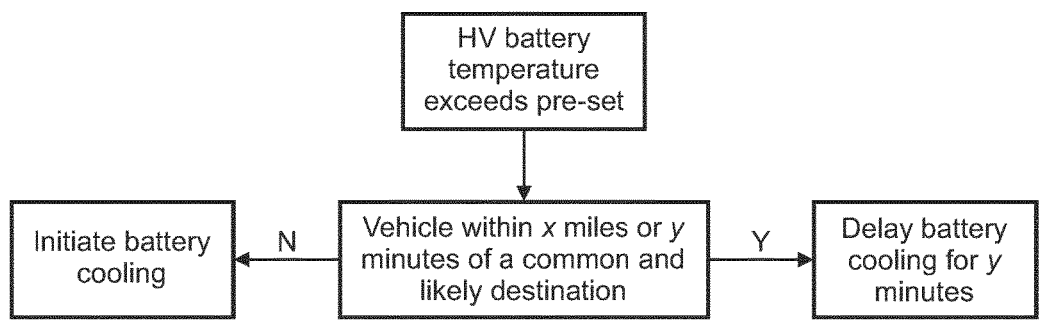
FIG. 2 is a flow diagram illustrating the general method of operation of the subsystem controller as used in the vehicle of FIG. 1.

The manner of operation of the controller 190 is illustrated schematically in FIG. 2. Initially a conventional thermostat-based actuator device (not shown) may be used to trigger an overall actuation of the control system which includes the controller 190. Under control of a conventional control system for a battery cooling system, this actuation simply enables activation of the cooling system upon the battery temperature being detected as having exceeded a predefined threshold value, in an analogous manner to a conventional thermostat-based engine cooling system. The difference now however is that the controller 190 performs a determination and control procedure, as exemplified in FIG. 2.

As shown in FIG. 2, the energy saving mode may be entered at a time when the cooling system is not activated, which is the time the temperature exceeds the pre-set, and the cooling system may be maintained in its non-activated state, i.e. delaying battery cooling.

According to that procedure, by use of location data defining a current location of the vehicle in comparison with a reference location, e.g. a driver's home or workplace, at which the vehicle can be expected to be parked with the motor switched off and thus natural cooling of the battery available, a distance still to be traveled by the vehicle before it is expected to reach that destination is calculated.

Such current location data may for example be obtained from a GPS system, satellite navigation data or a cellular network location determining system. The reference location may be defined by journey-specific destination data, e.g. from an input destination for a given journey, or it may—often possibly even more usefully—be defined by learned data from historical plural journeys obtained from previous journeys undertaken by the vehicle. Thus, the control system may "learn" those locations which can be expected to be destinations of the vehicle at which it is typically parked for an extended period of time, so that at such locations active cooling of the battery by the dedicated cooling system 180 can be dispensed with, at least for a prescribed period of time during which it can be detected or predicted that it is not needed or its non-activation can be tolerated, and instead natural cooling of the battery taken advantage of, with associated energy savings.

The calculated distance-to-destination value can be measured or defined in terms of either a physical distance, e.g. "x" miles, kilometers or meters, or it may alternatively be expressed as a time period to destination, e.g. "y" minutes, or hours, or seconds. In either case the calculated distance-to-destination value may be dependent on any of various additional parameters which may also be factored into the calculation procedure, such as driving conditions, weather conditions, time of day, geographical features, detected or historical data relating to traffic conditions, SOC of the battery of the charge storage module 150, and other energy demands being or expected to be made thereof over the remainder of the journey in question.

Therefore the energy saving mode is entered dependent, at least in part, on the physical distance or the time period.

Thus, and as illustrated in FIG. 2, if the calculated distance-to-destination value is determined to be sufficient, especially sufficiently low, such that it is expected that the vehicle 100 can reach its destination without the need for active battery cooling by the dedicated battery cooling subsystem 180, then the controller 190 temporarily deactivates the cooling subsystem 180. The duration of that deactivation is prescribed by the calculated distance-to-destination value, which only permits deactivation of the cooling subsystem for as long as it is not required or its non-activation can be tolerated. Therefore the period of time represents the approximate time required for the vehicle to reach the common and likely destination from the current location of the vehicle. As shown in FIG. 2, the energy saving mode is entered for a period of time in dependence on the value of the second vehicle operating parameter.

Therefore, if it should be, either from a detected measure of battery temperature or a predicted battery temperature taking into account driving conditions or various other vehicle operational parameters, that active battery cooling is in fact required or desirable, even before the vehicle's destination is reached, then the controller 190 causes the cooling subsystem 180 to be activated, thereby to cool the battery in accordance with normal conventional operation of the battery cooling subsystem 180.

Therefore the energy saving mode is entered for as long as inhibition of the subsystem can be tolerated or permitted.

By use of this "intelligent" battery cooling subsystem controller and control method, which deactivates the subsystem 180 when it is not strictly actually needed, or its deactivation or non-operation can be tolerated, especially for a certain period of time, energy usage can be reduced, thereby leading to less battery drain, lower levels of recharging that are required, possibly extending the life of the battery, and generally more energy- and environmentally-efficient vehicle control system performance. It may also help to increase the vehicle's fuel economy and electric range.

Figure 3:
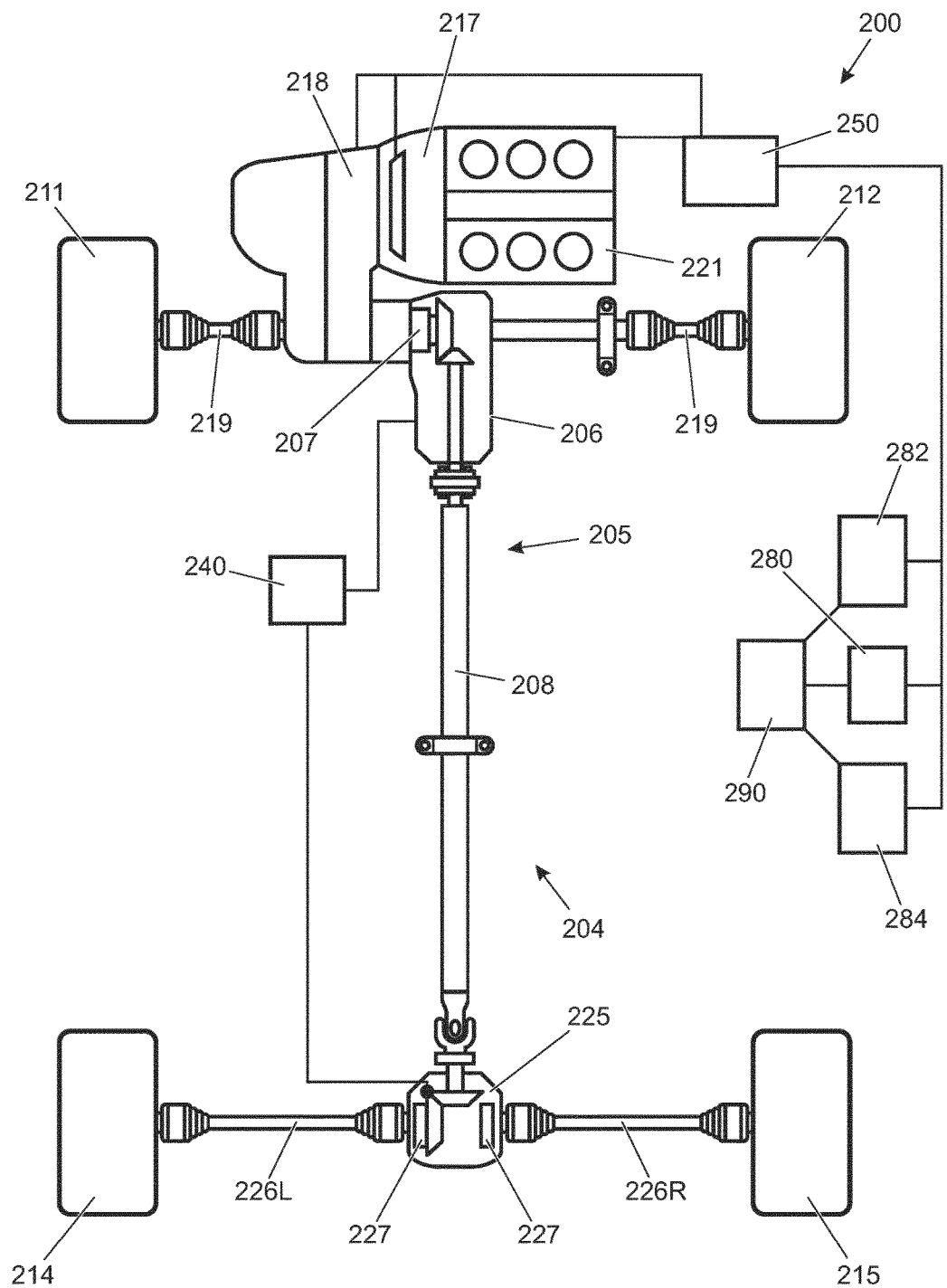
FIG. 3 is a schematic illustration of a conventional engine-drive vehicle which includes a controller for one or more other energy-consuming vehicle subsystems according to another embodiment of the invention.

Turning to the embodiment of FIG. 3, this shows schematically an example of a vehicle other than a hybrid electric vehicle, and to which some embodiments of the present invention are also applicable. Features of this embodiment that correspond in form and/or function to those of the first embodiment of FIG. 1 are referred to by the same reference numerals but incremented by 100.

FIG. 3 shows a known motor vehicle 200, which in this example is a four-wheel drive vehicle capable of being driven in either of a two wheel drive (2WD) mode or a four wheel drive (4WD) mode. A driveline 204 is connected to an internal combustion engine 221 by means of a clutch 217 and gearbox or transmission 218 and has a pair of front wheels 211, 212, an auxiliary driveline 205 and a pair of rear wheels 214, 215. The auxiliary driveline 205 may also be described as an auxiliary portion of the driveline 204 since it forms part of the driveline 204.

The driveline 204 is arranged selectively to transmit power supplied to it by the gearbox 218 from the engine 221 to the front wheels 211, 212 only (i.e. in a first mode of operation also referred to as a 2WD mode of operation) or to the front wheels 211, 212 and the rear wheels 214, 215 simultaneously (i.e. in a second mode of operation also referred to as a 4WD mode of operation).

Power is transmitted from the gearbox 218 to the front wheels 211, 212 by means of a pair of front drive shafts 219. Power is transmitted to the rear wheels 214, 215 by means of the auxiliary driveline 205. The auxiliary driveline 205 has a power transfer unit (PTU) 206 having releasable torque transmitting means in the form of a power transfer clutch (PTC) 207 operable to connect a drive shaft 208 of the auxiliary driveline 205 to the gearbox 218. The driveshaft 208 may be referred to as an auxiliary driveshaft in some arrangements since it is part of the auxiliary driveline 205. Alternatively it may be referred to as a main driveshaft or a propshaft. The PTC 207 is in the form of a multi-plate wet clutch (MPC).

The auxiliary drive shaft 208 is coupled in turn to a rear drive unit (RDU) 225 operable to couple the auxiliary drive shaft 208 to left and right rear drive shafts 226L, 226R, respectively. The RDU 225 also has releasable torque transmitting means in the form of a pair of clutches 227. The RDU 225 is thereby operable to connect the auxiliary drive shaft 208 to the rear drive shafts 226L, 226R when the 4WD mode of operation is required. It is to be understood that differential rates of rotation of the respective rear drive shafts 226L, 226R may be accommodated by slip of the clutches 227.

The driveline 204 has a controller 240 arranged to control operation of the PTU 206 and clutches 227. When a 4WD mode of operation is required the controller 240 is arranged to close the PTC 207 and to close clutches 227 of the RDU 225.

In analogous manner to the embodiment of FIG. 1, the vehicle 200 further includes an embodiment of a control system according to the present invention, which comprises an energy-consuming subsystem 280 and a controller 290 for controlling operation of the subsystem 280. The subsystem 280 is itself powered from a battery or other charge storage device 250 which powers the vehicle's various on-board systems and operational components. The subsystem 280 may be any energy-consuming subsystem, but will usually be one that is relatively energy- or power-hungry, such as one or more heating or cooling devices, e.g. a battery cooling system, a heating system for the vehicle seats, an air conditioning system, or a heating or de-icing system for the vehicle's headlights or windows.

It is possible of course for various other types, and any number, of energy-consuming subsystems to have this embodiment of the invention applied to them, and indeed as also illustrated by way of example in FIG. 3, one or more additional energy-consuming vehicle subsystems 282, 284, etc may also be powered from the battery 250 and be under the control of the controller 290 of the control system of this embodiment of the invention.

Figure 4:
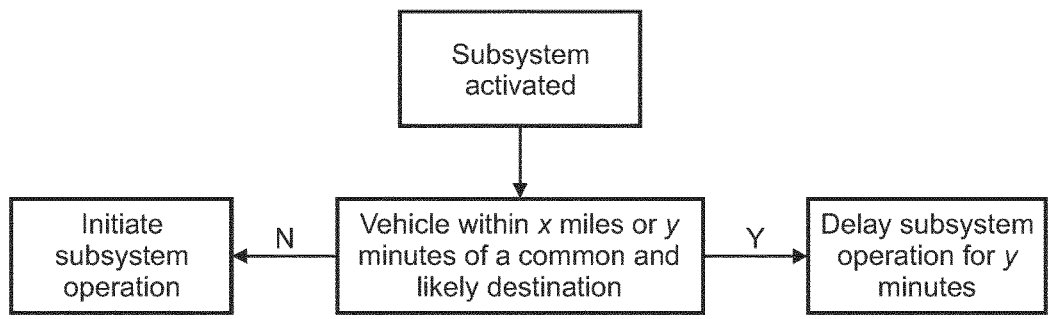
FIG. 4 is a flow diagram illustrating the general method of operation of the subsystem controller as used in the vehicle of FIG. 3.

The manner of operation of the controller 290 in this embodiment is illustrated schematically in FIG. 4, which is analogous to the flow diagram of FIG. 2. Initially a conventional thermostat-based actuator or other trigger device (not shown) may be used to trigger an overall actuation of the control system which includes the controller 290. Under control of a conventional control system for e.g. a battery cooling system (or other heating or cooling subsystem, as the case may be) 280, this actuation simply enables activation of the subsystem 280 upon e.g. the battery temperature being detected as having exceeded a predefined threshold value, in an analogous manner to a conventional thermostat-based engine cooling system. The difference now however is that the controller 290 performs a determination and control procedure, as exemplified in FIG. 4.

As shown in FIG. 4, the energy saving mode may be entered at a time when the cooling system is activated, which is the time the subsystem is activated, and the cooling system may be deactivated, i.e. delaying subsystem operation.

According to that procedure, by use of location data defining a current location of the vehicle in comparison with a reference location, e.g. a driver's home or workplace, at which the vehicle can be expected to be parked with the motor switched off and thus e.g. natural cooling of the battery available, a distance still to be traveled by the vehicle before it is expected to reach that destination is calculated.

Such current location data may for example be obtained from a GPS system, satellite navigation data or a cellular network location determining system. The reference location may be defined by journey-specific destination data, e.g. from an input destination for a given journey, or it may—often possibly even more usefully—be defined by learned data from historical plural journeys obtained from previous journeys undertaken by the vehicle. Thus, the control system may "learn" those locations which can be expected to be destinations of the vehicle at which it is typically parked for an extended period of time, so that at such locations e.g. active cooling of the battery by the dedicated cooling system 280 can be dispensed with, at least for a prescribed period of time during which it can be detected or predicted that it is not needed or its non-activation can be tolerated, and instead e.g. natural cooling of the battery taken advantage of, with associated energy savings. As shown in FIG. 4, the energy saving mode is entered for a period of time in dependence on the value of the second vehicle operating parameter.

The calculated distance-to-destination value can be measured or defined in terms of either a physical distance, e.g. "x" miles, kilometers or meters, or it may alternatively be expressed as a time period to destination, e.g. "y" minutes, or hours, or seconds. In either case the calculated distance-to-destination value may be dependent on any of various additional parameters which may also be factored into the calculation procedure, such as driving conditions, weather conditions, time of day, geographical features, detected or historical data relating to traffic conditions, SOC of the battery of the charge storage module 250, and other energy demands being or expected to be made thereof over the remainder of the journey in question.

Thus, and as illustrated in FIG. 4, if the calculated distance-to-destination value is determined to be sufficient, especially sufficiently low, such that it is expected that the vehicle 200 can reach its destination without the need for e.g. active battery cooling by the dedicated battery cooling subsystem 280, then the controller 290 temporarily deactivates the cooling subsystem 280. The duration of that deactivation is prescribed by the calculated distance-to-destination value, which only permits deactivation of the cooling subsystem for as long as it is not required or its non-activation can be tolerated.

Therefore, if it should be, for example, either from a detected measure of battery temperature or a predicted battery temperature taking into account driving conditions or various other vehicle operational parameters, that active battery cooling is required or desirable, even before the vehicle's destination is reached, then the controller 290 causes the cooling subsystem 280 to be activated, thereby to cool the battery in accordance with normal conventional operation of the battery cooling subsystem 280.

By use of this "intelligent" battery cooling (or other, as the case may be) subsystem controller 290 and control method, which deactivates the subsystem 280 when it is not strictly actually needed, or its deactivation or non-operation can be tolerated, especially for a certain period of time, energy usage can be reduced, thereby leading to less battery drain, lower levels of recharging that are required, possibly extending the life of the battery, and generally more energy- and environmentally-efficient vehicle control system performance. It may also help to increase the vehicle's fuel economy and electric range.

It is to be understood that the above description of some embodiments and aspects of the invention has been by way of non-limiting examples only, and various modifications may be made from what has been specifically described and illustrated whilst remaining within the scope of the invention as defined in the appended claims.

Throughout the description and claims of this specification, the words "comprise" and "contain" and variations of those words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a vehicle, the vehicle comprising:
   at least one energy-consuming cooling system configured to reduce an operating temperature of a charge storage device, and
   an actuator for the at least one cooling system, configured to activate or deactivate the at least one cooling system in accordance with vehicle operational requirements;
   wherein the control system is configured to:
   determine a value of a vehicle operating parameter which is dependent on a location of the vehicle, and
   control the actuator of the at least one cooling system so as to enter an energy saving mode in which operation of the at least one cooling system is inhibited in dependence on the value of the determined vehicle operating parameter.

2. A control system according to claim 1, wherein if the at least one cooling system is activated when the energy saving mode is entered, the at least one cooling system is deactivated, and wherein if the at least one cooling system is not activated when the energy saving mode is entered, the at least one cooling system is maintained in a non-activated state.

3. A control system according to claim 1, wherein the control system is configured to control the actuator of the at least one cooling system so as to enter the energy saving mode for a period of time in dependence on the value of the vehicle operating parameter.

4. A control system according to claim 1, wherein the vehicle comprises an electrical propulsion motor and wherein the charge storage device is for powering the motor.

5. A control system according to claim 1, wherein the vehicle operating parameter is a distance between a location of the vehicle at a selected time and a destination.

6. A control system according to claim 1, wherein a period of time for which the at least one cooling system is inhibited by its actuator, in dependence on the vehicle operating parameter, is dependent on a value of the or each said respective first vehicle operating parameter which is controlled by the at least one cooling system.

7. A control system according to claim 6, wherein a period of time for which inhibition is controlled is selected in dependence on a current demand for cooling of the charge storage device or a predicted demand for cooling of the charge storage device as dictated by the vehicle operating parameter.

8. A control system according to claim 1, wherein a period of time for which the at least one cooling system is inhibited by the actuator, in dependence on the vehicle operating parameter, is dependent on at least one of an identity of, state of, current demand of, and a predicted demand of the at least one cooling system.

9. A control system according to claim 1, wherein the value of the vehicle operating parameter is a distance between a current location of the vehicle and a reference location, wherein the distance is determined, calculated or measured in terms of one or more driving or vehicle operational parameters and one of a group comprising a physical distance from the current location to the reference location and a particular time period needed to cover the physical distance, and wherein the energy saving mode is entered dependent, at least in part, on the physical distance.

10. A vehicle comprising a control system according to claim 1.

11. A control system for a vehicle, the vehicle comprising:
at least one energy-consuming cooling system configured to reduce an operating temperature of a charge storage device, and
an actuator for the at least one cooling system, configured to activate or deactivate the at least one cooling system in accordance with vehicle operational requirements;
wherein the control system is configured to:
determine a value of a vehicle operating parameter which is dependent on a location of the vehicle, and
control the actuator of the at least one cooling system so as to deactivate the at least one cooling system in dependence on the value of the determined vehicle operating parameter.

12. A control system according to claim 11, wherein the control system is configured to control the actuator of the at least one cooling system so as to deactivate the at least one cooling system for a prescribed period of time in dependence on the value of the vehicle operating parameter.

13. A control system according to claim 11, wherein a prescribed period of time for which the at least one cooling system is deactivated by the actuator, is dependent on a value of the operating temperature which is controlled by the at least one cooling system and the vehicle operating parameter.

14. A control system according to claim 13, wherein the prescribed period of time is selected in dependence on a current demand for cooling of the charge storage device or a predicted demand for cooling of the charge storage device as dictated by the vehicle operating parameter.

15. A control system according to claim 11, wherein a prescribed period of time for which the at least one cooling system is deactivated by the actuator, is dependent on at least one of an identity of, a state of, a current demand of, and a predicted demand of the at least one cooling system.

16. A control system according to claim 11, wherein the value of the vehicle operating parameter is a distance between a current location of the vehicle and a reference location, wherein the distance is determined, calculated or measured in terms of one or more driving or vehicle operational parameters and one of a group comprising a physical distance from the current location to the reference location and a particular time period needed to cover the physical distance, and wherein the energy saving mode is entered dependent, at least in part, on the physical distance.

17. A vehicle comprising a control system according to claim 11.

18. A controller for controlling at least one energy-consuming cooling system of a vehicle, the cooling system being configured to reduce an operating temperature of a charge storage device,
the vehicle further comprising an actuator for the at least one cooling system, configured to selectively activate or deactivate the at least one cooling system in accordance with vehicle operational requirements,
wherein the controller is operable to:
determine a value of a second vehicle operating parameter which is dependent on a location of the vehicle, and
control the actuator so as to enter an energy saving mode in which operation of the at least one cooling system is inhibited in dependence on the value of the determined vehicle operating parameter.

19. A method of controlling a vehicle, the vehicle including:
at least one energy-consuming cooling system to reduce an operating temperature of a charge storage device, and
an actuator for the at least one cooling system, configured to selectively activate or deactivate the at least one cooling system in accordance with vehicle operational requirements;
the method comprising:
determining a value of a vehicle operating parameter which is dependent on a location of the vehicle, and
controlling the actuator of the at least one cooling system so as to enter an energy saving mode in which operation of the at least one cooling system is inhibited in dependence on the value of the determined vehicle operating parameter.

20. A method of controlling a vehicle, the vehicle including:
at least one energy-consuming cooling system to reduce an operating temperature of a charge storage device, and
an actuator for the at least one cooling system, configured to selectively activate or deactivate the at least one cooling system in accordance with vehicle operational requirements;
the method comprising:
determining a value of a vehicle operating parameter which is dependent on a location of the vehicle, and
controlling the actuator of the at least one cooling system so as to deactivate the at least one cooling system for a prescribed period of time which is dependent on a value of the determined vehicle operating parameter.

21. A non-transitory computer readable medium containing computer program code for controlling a vehicle to carry out a method comprising:
determining a value of a vehicle operating parameter which is dependent on a location of the vehicle; and
controlling an actuator for at least one energy-consuming cooling system, the at least one cooling system configured to reduce an operating temperature of a charge storage device, the actuator configured to selectively activate or deactivate the at least one cooling system in accordance with vehicle operational requirements, the actuator being controlled so as to enter an energy saving mode in which operation of the at least one cooling system is inhibited in dependence on the value of the determined vehicle operating parameter.

* * * * *